(12) United States Patent
Wu

(10) Patent No.: US 10,775,975 B2
(45) Date of Patent: Sep. 15, 2020

(54) DETECTING SOFTWARE USER INTERFACE ISSUES IN MULTIPLE LANGUAGE ENVIRONMENTS

(71) Applicant: Citrix Systems, Inc., Fort Lauderdale, FL (US)

(72) Inventor: Hao Wu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/109,935

(22) Filed: Aug. 23, 2018

(65) Prior Publication Data
US 2020/0064977 A1 Feb. 27, 2020

(51) Int. Cl.
*G06F 3/0484* (2013.01)
*G06F 11/36* (2006.01)
*G06F 9/451* (2018.01)
*G06F 40/205* (2020.01)

(52) U.S. Cl.
CPC ............ *G06F 3/0484* (2013.01); *G06F 9/451* (2018.02); *G06F 11/3616* (2013.01); *G06F 40/205* (2020.01)

(58) Field of Classification Search
CPC .............. G06F 17/289; G06F 17/2836; G06F 17/2705; G06F 3/0484; G06F 11/3616; G06F 9/451; G06F 40/47; G06F 40/58; G06F 40/205; G06F 8/38
See application file for complete search history.

(56) References Cited

U.S. PATENT DOCUMENTS

2012/0109869 A1* 5/2012 Sahibzada ................ G06N 5/02
706/47
2013/0006603 A1* 1/2013 Zavatone .............. G06F 17/289
704/2

OTHER PUBLICATIONS

Lee, "Unicode Basics", (May 1, 2018), <URL http://ergoemacs.org/emacs/unicode_basics.html/>, p. 1-5 (Year: 2018).*

* cited by examiner

*Primary Examiner* — Ajay M Bhatia
*Assistant Examiner* — Mong-Shune Chung
(74) *Attorney, Agent, or Firm* — Banner & Witcoff, Ltd.

(57) ABSTRACT

Methods, systems, computer-readable media, and apparatuses for parsing a user interface (UI) product to obtain a UI element provided therein, the UI product prepared in a first language. A UI element is replaced with a converted UI element, in which the converted UI element approximates a translation of the UI element into a second language different from the first language. After replacement of the UI element, a detection is made as to whether a UI issue exists. When a UI issue is detected, the converted UI element is modified so that translation of the UI product into the second language does not include the detected UI issue. The UI element is provided in a language different from the first language via the UI product based on the converted UI element.

13 Claims, 14 Drawing Sheets

```
<div class='table-responsive'>_</div>
<p></p>
<!-- Table (Session 4) / End -->
<!-- Table (Session 5) -->
<div class='table-responsive'>_</div>
<p></p>
<!-- Table (Session 5) / End -->
<!-- Table (Session 6) -->
<div class='table-responsive'>
<table class='table-striped table-bordered'>
<thead>_</thread>
<tbody>
   <tr>_</tr>
   <tr>_</tr>
   <tr>_</tr>
   <tr>
      <td class = "menu">_</td>
      <strong>
         " CONFERENCE RECEIPTION "
      <strong>
   </td>
   </tr>
</tbody>
</table>
<p> g</p>
<hr>
<!-- Table (Session 6) / End -->
```

1400 (arrow pointing to "CONFERENCE RECEIPTION")

FIG. 14A

| 1800 - 1900 | CONFERENCE RECEPTION |

FIG. 14B

DETECTING SOFTWARE USER INTERFACE ISSUES IN MULTIPLE LANGUAGE ENVIRONMENTS

FIELD

Aspects described herein generally relate to computer hardware and software. In particular, one or more aspects of the disclosure generally relate to detection and correction of issues for a user interface (UI) that is to be translated into one or more languages other than an initial language in which the UI was created.

BACKGROUND

UI product translation issue detect mechanisms are described below.

A first UI product translation issue detect mechanism corresponds to multiple language UI testing. This is a way of finding issues in a user interface in which strings are first translated by a linguist (i.e., by a human), and then test engineers verify the product UI in multiple language environments. A problem exists with this mechanism in that testing the product UI in different languages is fairly time consuming. Additionally, the test effort increases when more languages are supported in the product UI.

A second UI product translation detect mechanism involves "pseudo testing." This mechanism uses machine translation (e.g., machine translation software) to translate strings from a first language (e.g., English) into multiple languages, and then the translated product UI is tested with the "pseudo" translated strings. A problem exists with pseudo testing in that there remains a need to test the product UI with accurately translated strings from the UI level. A problem also exists in that the machine translated strings are often not the same length as to the strings translated by linguists. As such, the fact that no issue is reported after machine translation cannot guarantee that no issue is reported after human translation.

A third UI product translation detect mechanism involves static code analysis, which finds issues at the source code level (the code used to create the UI product). A problem exists in that for many modern products (especially web based products), the maximum length of each element can be obtained when they are being rendered in containers (i.e., UIs being rendered in web browsers). Furthermore, the issue detection accuracy is often fairly low.

There is a need to provide for a UI translation product solution that provides for an accurate and less time consuming method than the ones described above.

SUMMARY

Aspects of the disclosure relate to various systems and techniques that provide for a method and apparatus that detects and corrects issues for a user interface (UI) that is to be translated into one or more languages other than an initial language in which the UI was created (e.g., other than in English).

At least one aspect is directed to a method that comprises parsing a user interface (UI) product to obtain a UI element provided therein, the UI product prepared in a first language. The method also comprises replacing a UI element with a converted UI element, the converted UI element approximates a translation of the UI element into a second language different from the first language. The method further comprises detecting whether a UI issue exists in the UI product after replacement of the UI element. The method still further comprises, when a UI issue is detected, modifying the converted UI element so that translation of the UI product into the second language does not include the detected UI issue. The method also comprises providing the UI element in a language different from the first language via the UI product based on the converted UI element.

At least one aspect is directed to one or more non-transitory computer-readable media storing instructions which, when executed by a system that includes at least one processor and a memory, cause the system to: parse a user interface (UI) product to obtain a UI element provided therein, the UI product prepared in a first language, replace a UI element with a converted UI element, the converted UI element approximates a translation of the UI element into a second language different from the first language, detect whether a UI issue exists in the UI product after replacement of the UI element, when a UI issue is detected, modify the converted UI element so that translation of the UI product into the second language does not include the detected UI issue, and provide the UI element in a language different from the first language via the UI product based on the converted UI element.

At least one aspect is directed to comprises computing device comprising: a processor configured to: parse a user interface (UI) product to obtain a UI element provided therein, the UI product prepared in a first language; replace a UI element with a converted UI element, wherein the converted UI element approximates a translation of the UI element into a second language different from the first language; detect whether a UI issue exists in the UI product after replacement of the UI element; when a UI issue is detected, modify the converted UI element so that translation of the UI product into the second language does not include the detected UI issue; and provide, based on the converted UI element, the UI element in a language different from the first language via the UI product for display on a display. The computing device further comprising a memory configured to store information associated with the converted UI element and modified converted UI element, the information including, for each of the converted UI element and the modified converted UI element, a string length and whether or not the string length results in a UI issue.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 14A depicts sample HTML code that may be used to create a UI product and that may be tested, in accordance with one or more illustrative aspects described herein.

FIG. 14B depicts a portion of a UI display created by the sample HTML code of FIG. 14A, which may be tested using optical character recognition or by other techniques, in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards detection and correction of issues for a user interface (UI) that is to be translated into one or more languages other than an initial language in which the UI was created (e.g., other than in English). For example, translation issues may arise when a UI created using English language characters is to be translated into Asian characters or Arabic characters. This may be due, for example, to the translated phrase being larger in the number of characters as the English language phrase that it is replacing, whereby that larger size may not be properly accommodated in the UI that was created using the English language. For example, if a word in English having five characters has an equivalent Arabic word having ten characters, and if the portion of the UI that the English word is to be located, such as a UI button, can only accommodate up to six characters, the replacement of the five-character English word with the ten-character Arabic word may lead to the words extending out from the area on the UI that the button that the words describe its operation. This may result in overlap of words of one UI button with another UI button on the UI, leading to confusion to a user of the UI. The detection and correction of issues may be performed prior to translation of a resource file into another language from a first language (e.g., translated into Chinese from English in which conversion into a different character set is required, or translated into German from English in which conversion into a different character set is not required), thereby saving on the amount of time and effort required to detect and correct any possible UI translation issues.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
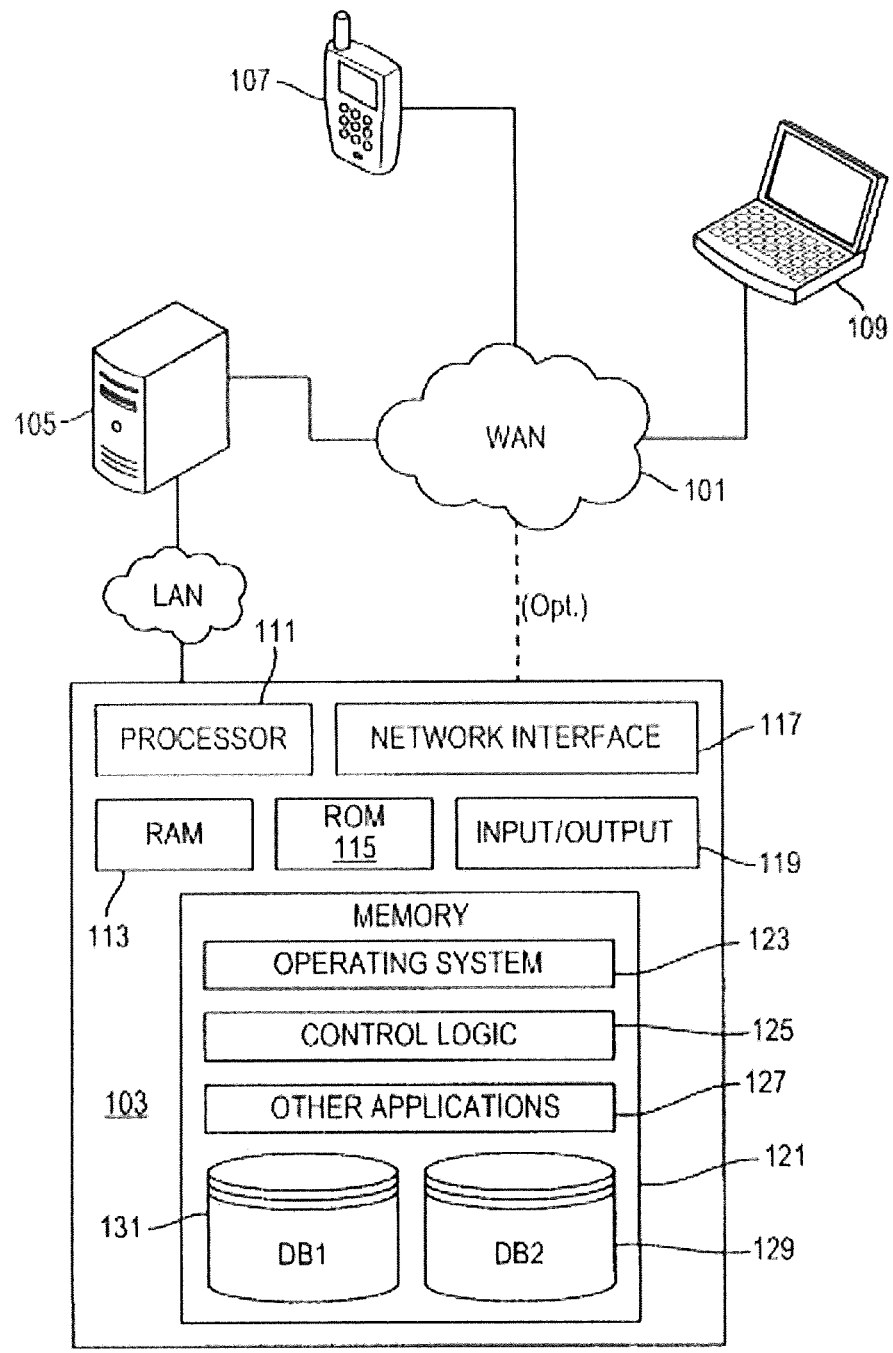
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database DB1 and a second database DB2. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
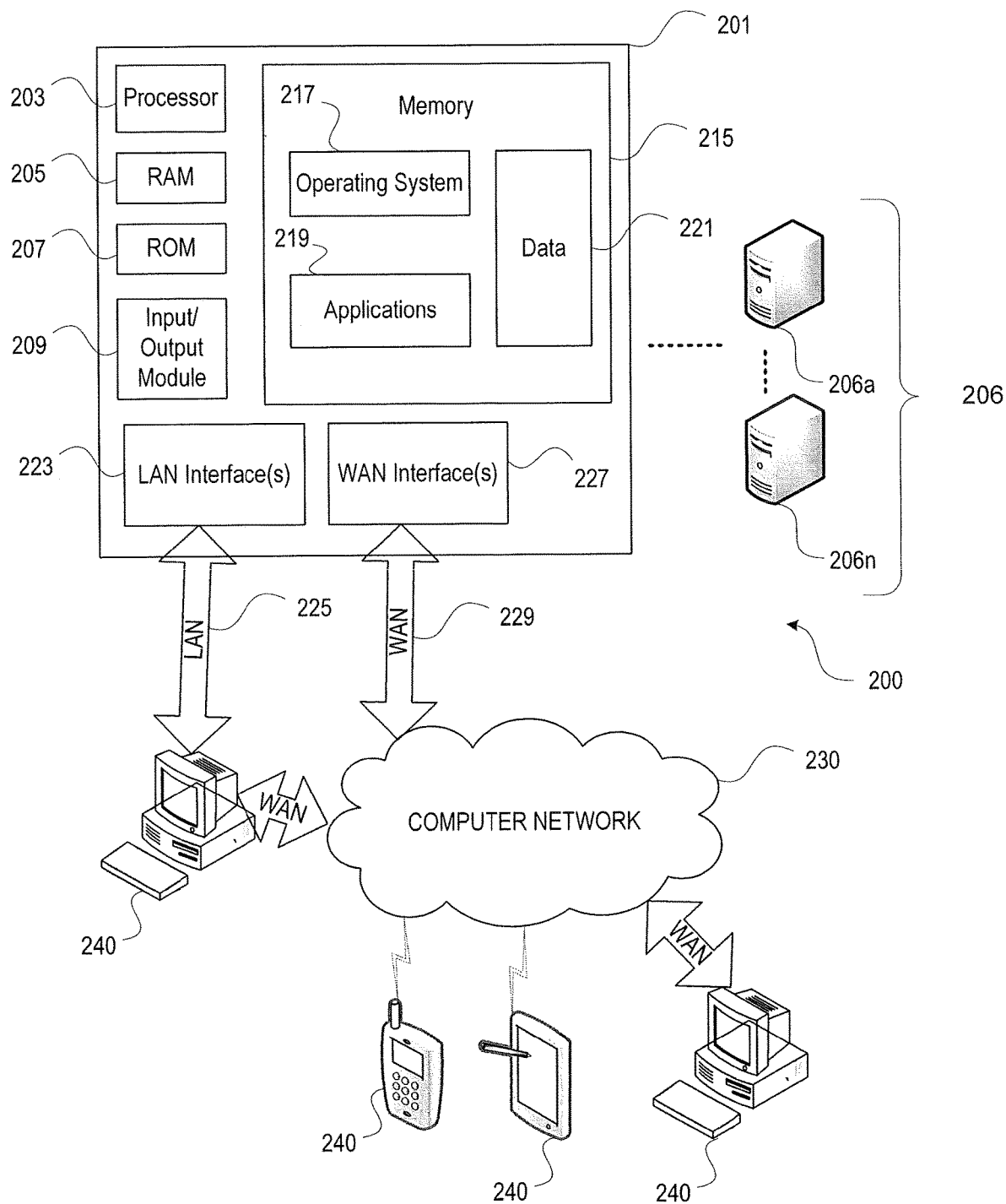
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206 a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments, the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
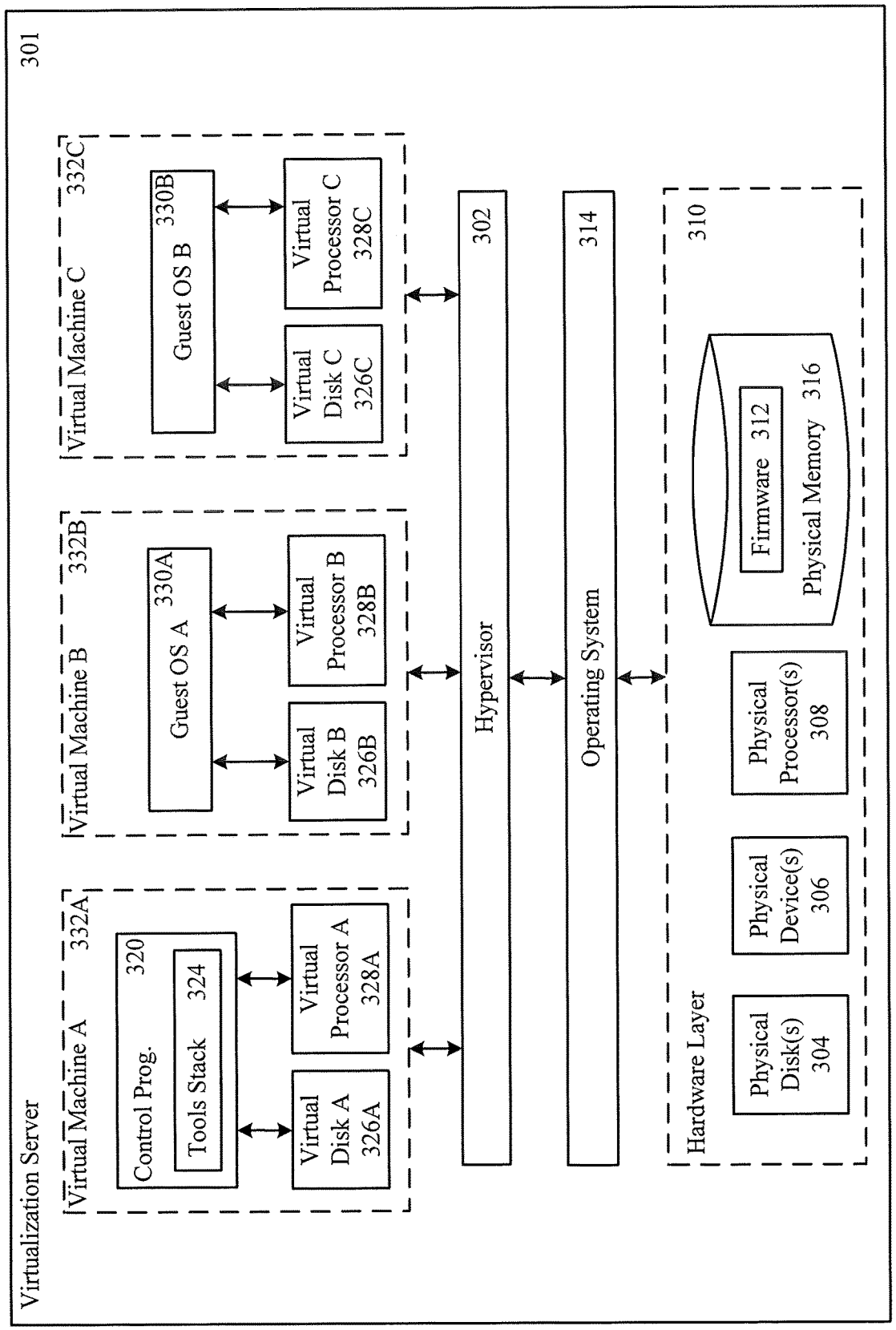
FIG. 3 depicts an illustrative virtualization (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
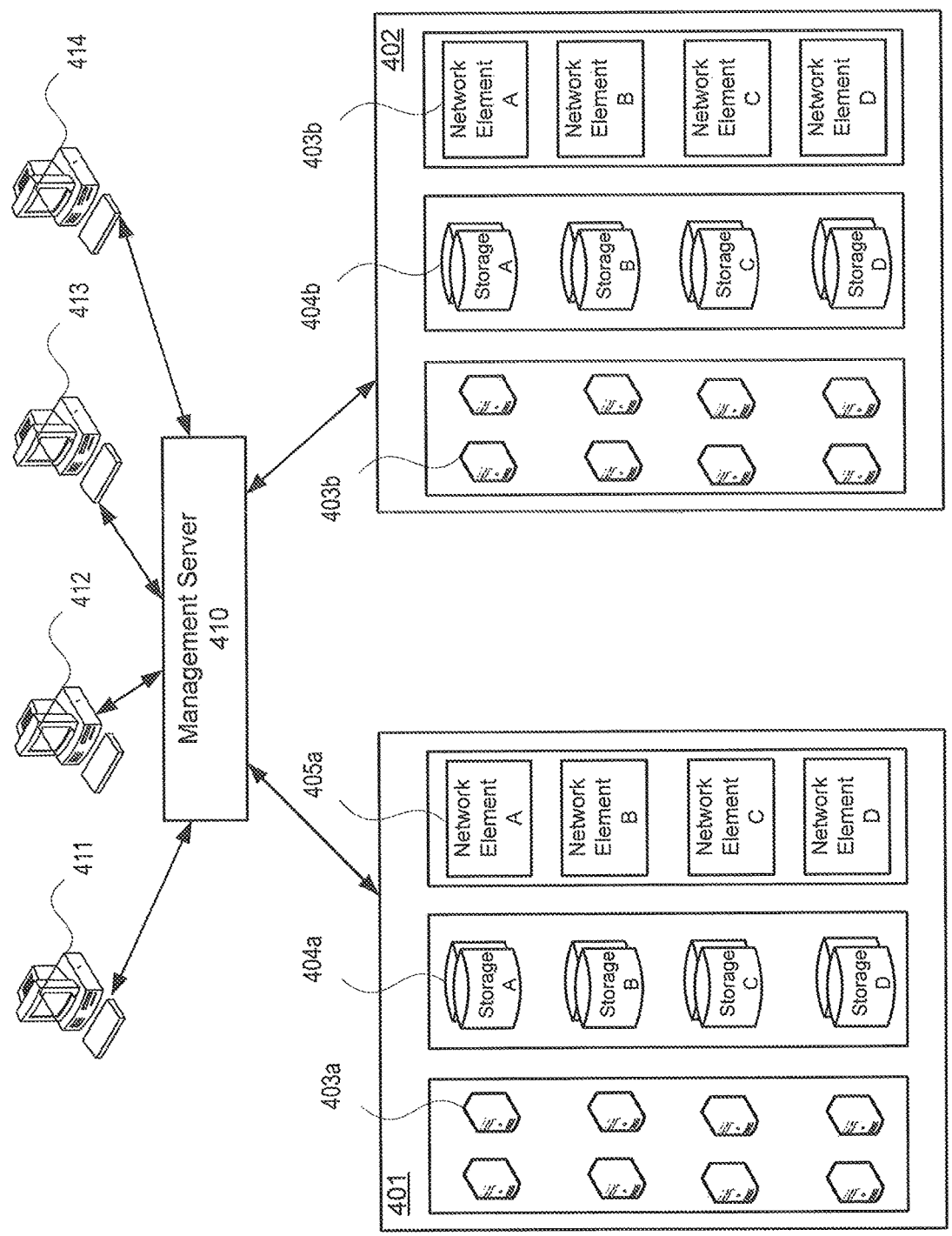
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

A number of embodiments will now be discussed in greater detail. In particular, and as introduced above, some aspects of the disclosure generally relate to detection and correction of issues (e.g., anomalies, or errors) for a user interface (UI) that is to be translated into one or more languages other than an initial language in which the UI was created (e.g., other than in English).

When a UI product, which may be a software application used to create an interface to for display on a display such as a computer monitor or on a smart phone, for a user to navigate a mobile application, a website, or other computer-implemented feature, is to be translated from one language (e.g., English) into multiple languages (e.g., into Chinese, German, and Persian), the inventor has determined that issues (i.e., string truncation, overlap) appearing in the UI are mostly caused by translated strings that are longer than their corresponding original language (e.g., English) strings. Taking Citrix cloud platform as an example, the inventor has determined that 95% of the issues that occur in a translated user interface are caused by longer translated strings (e.g., a 15 character English language string translated into a 20 character German language string).

One or more aspects described herein provide for a dynamic test mechanism for detecting potential UI issues when a UI product is prepared in one language, e.g., in English, and has to be translated into one or more other languages for use in other-language-speaking areas of the World. A UI issue is something that may create a problem when the UI product is being displayed to a user, such as text that describes the purpose of a UI button extending outside the boundaries of the UI button and onto another UI button or text area of the UI, or text describing a UI button being truncated and not readily understandable to a user of the UI. The detecting of potential UI issues may be accomplished by replacing UI elements in the UI product with localized strings (i.e., German strings, or Japanese strings) to find the conditions when issues may happen for each UI element of the UI product. By way of example, button A of a UI product displayed on a computer display may have a truncation problem when it has to accommodate more than 10 characters, or text area B of a UI product may overlap with text area C of the UI product when text area B has to accommodate more than 100 characters. Each of these may result in a UI issue that should be resolved prior to translating the entire UI product into another language. In order to detect potential UI conditions that may occur, the dynamic test mechanism scans translated strings in the UI product without having to translate the entire UI product, to thereby determine whether any UI issues may exist when the UI product is translated into one or more other languages. This saves on translation costs of the entire UI product (e.g., requiring the efforts of a linguist skilled in one or more languages) that may be very high (e.g., costs well into the thousands of dollars).

Figure 5:
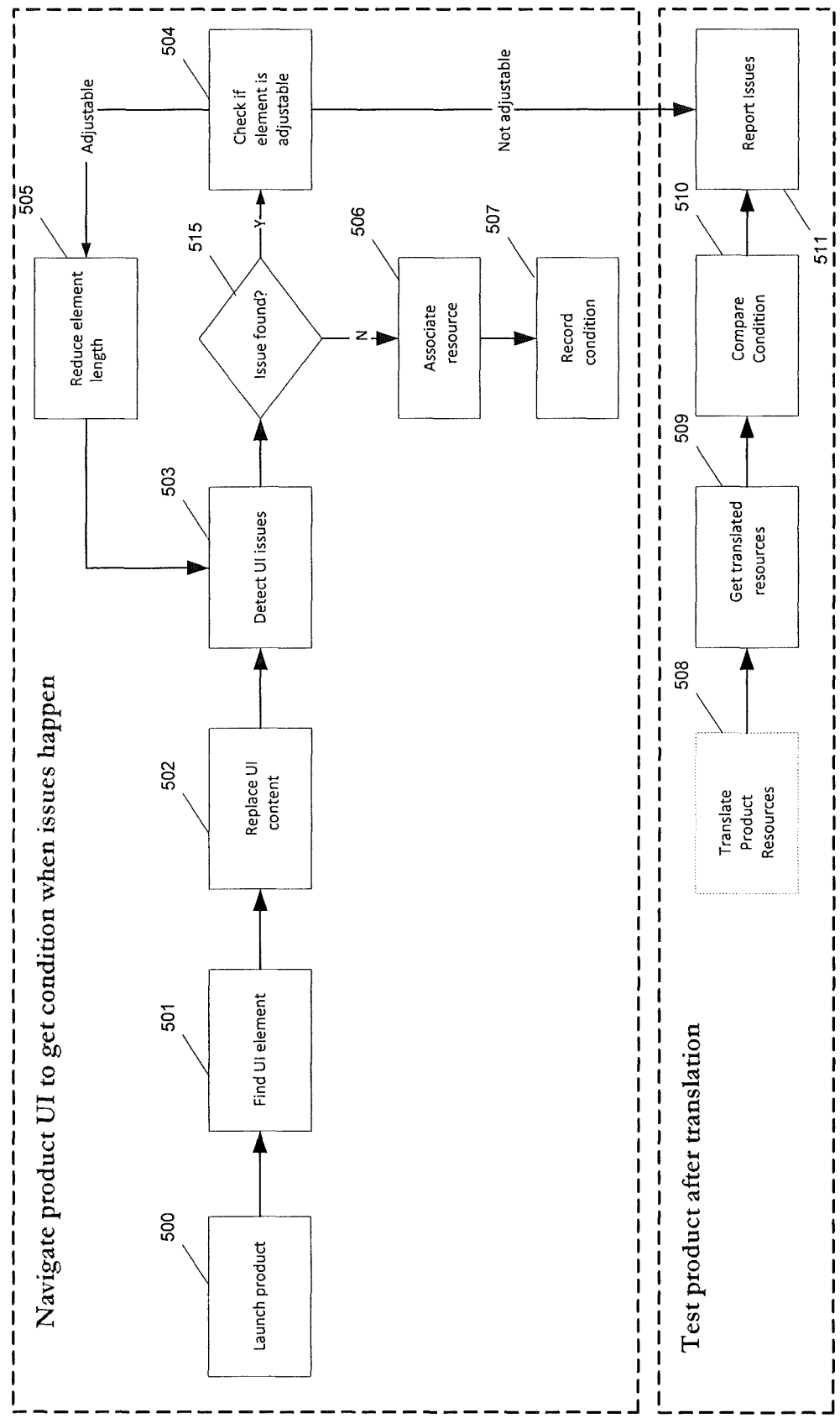
FIG. 5 depicts a flow diagram that illustrates a method that navigates a UI in one language to detect any issues that may occur due to translation of the UI into another language, and that tests a UI for any issues after translation of the UI into another language, in accordance with one or more illustrative aspects described herein.
Figure 6:
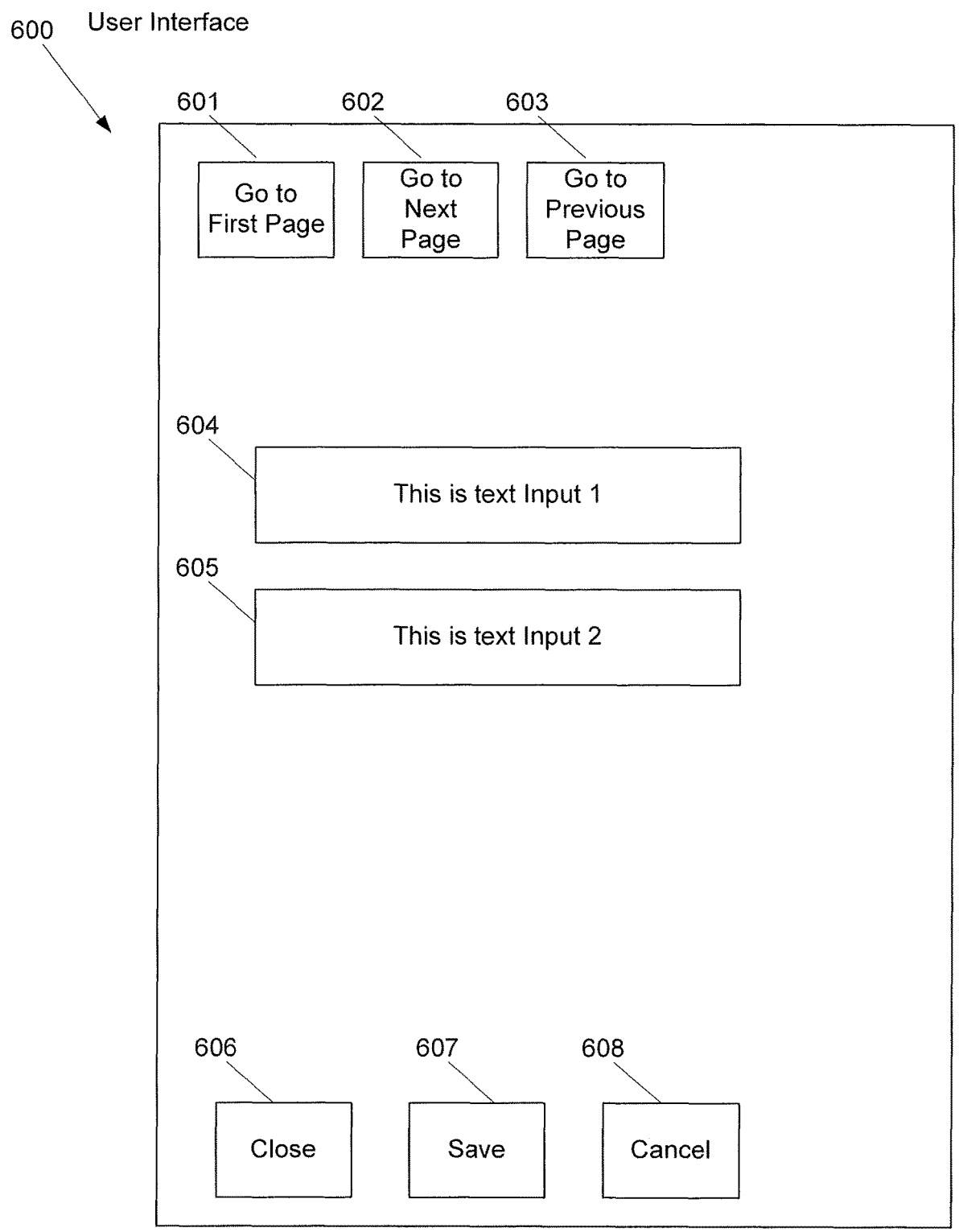
FIG. 6 depicts an example UI prior to translation from a first language (English) in which the UI was created.

FIG. 5 depicts a flow diagram that illustrates a method that navigates a UI in one language to detect any issues that may happen due to translation of the UI into another language, and that tests a UI for any issues after translation of the UI into another language, in accordance with one or more illustrative aspects described herein. The description of the flow diagram in FIG. 5 will be made with reference to example UIs 600, 700, 800, 900, 1000, 1100, 1200 and 1300 in FIGS. 6-13. In particular, FIG. 6 shows an example UI 600 having three buttons 601, 602, 603 located at a top portion of UI 600, for a user to select to move amongst various web pages being navigated by the user using a web browser. UI 600 also includes a first text area 604 and a second text area 605 located in a middle portion of UI 600, which are areas of UI 600 a user may enter text (e.g., for a chat session with another user or with a customer support agent, for example). UI 600 further includes three buttons 606, 607 and 608 located at a bottom portion of UI 600, for a user to either close an application that had been opened during a current session, to save changes made to the application during a current session, or to cancel any changes made to the application during a current session. The steps of FIG. 5 may be performed by a computing device, such as computing device 201 shown in FIG. 2, or by one or more of the network nodes 103, 105, 107, and 109 shown in FIG. 1. One or more of the steps of FIG. 5 may be performed by a virtual machine, accessible by computing device 201 via virtualization server 301 as shown in FIG. 3 for example, whereby data used for performing one or more of the steps of FIG. 5 may be obtained and stored in one or more storages 404 a as shown in FIG. 4 that are accessed by computing device 201 via management server 410.

Referring back to FIG. 5, in step 500, a UI test program launches a UI product to be tested for any UI issues when the UI product is later translated from a first language in which the UI product is created (e.g., in English), to a second language (e.g., Chinese, or Cyrillic, or Arabic) in which the UI product will be used in certain areas of the World. The UI test program may perform manual or automated UI navigation on the UI product to detect any potential UI issues, as will be described below in more detail. By way of example, the UI test program that performs this step and other steps of FIG. 5 may be executed by computing device 201 shown in FIG. 2, or by one or more of the network nodes 103, 105, 107, and 109 shown in FIG. 1.

In step 501, during UI navigation of the UI product, the UI test program finds all UI elements within the UI product, whereby a UI element may correspond to text, or a text box for displaying or receiving multiple lines of text, or a particular user input (e.g., a single line in the UI where the user enters his/her password), etc. The finding of UI elements within the UI product may be performed by parsing the software used to create the UI, and/or by performing optical character recognition (OCR) of the UI that is displayed on a display (e.g., a computer monitor) to determine all text areas, buttons, text boxes, and user inputs that correspond to separate UI elements of the UI. For example, if the UI product allows access of a UI from the backend (i.e., an API that allows parsing of each line of code making up the UI product), then all UI elements of a UI created by the UI product may be found using this backend process. If the UI product does not allow access of the UI from a backend process, then OCR techniques (e.g., screen shots using Adobe Snipping Tool) may be used to determine the UI elements of the UI from the frontend (e.g., via screen shots of the UI using OCR techniques), as a frontend process.

In step 502, UI content for each of the UI elements found in step 501 is replaced. In more detail, for each of the UI elements found in step 501, the UI test program replaces the content in the UI element by the following process. If the content has translation-ready content associated with it, the UI test program replaces the content with a translated string corresponding to the associated translation-ready content. For example, when the UI product is created by a software engineer using HTML code for implementing a UI for a web-based application, a bottom right button provided on the UI may correspond to a "Save" button, whereby the word "Save" is stored, along with one or more translation-ready equivalents to the word "Save", in one or more other languages. That way, when a user selects "German" for a "Choose Language of Choice" on the UI, the translation-ready content replaces the word "Save" on the bottom right button of the UI with its German equivalent, "Sparen", which is stored as the German translation-ready content for "Save" in the HTML code. If the content does not have translated-ready content associated with it, then the test program may perform one or more of the following three procedures:

a. Call a machine translation application program interface (API) to translate the content in another language.
b. Increase the length of string with English characters by a fixed amount (e.g., double it).
c. Fill the string with characters of a different language set (e.g., Asian characters) having a length that is 1.x or original length (where x is an integer between 0 and 9).

Figure 7:
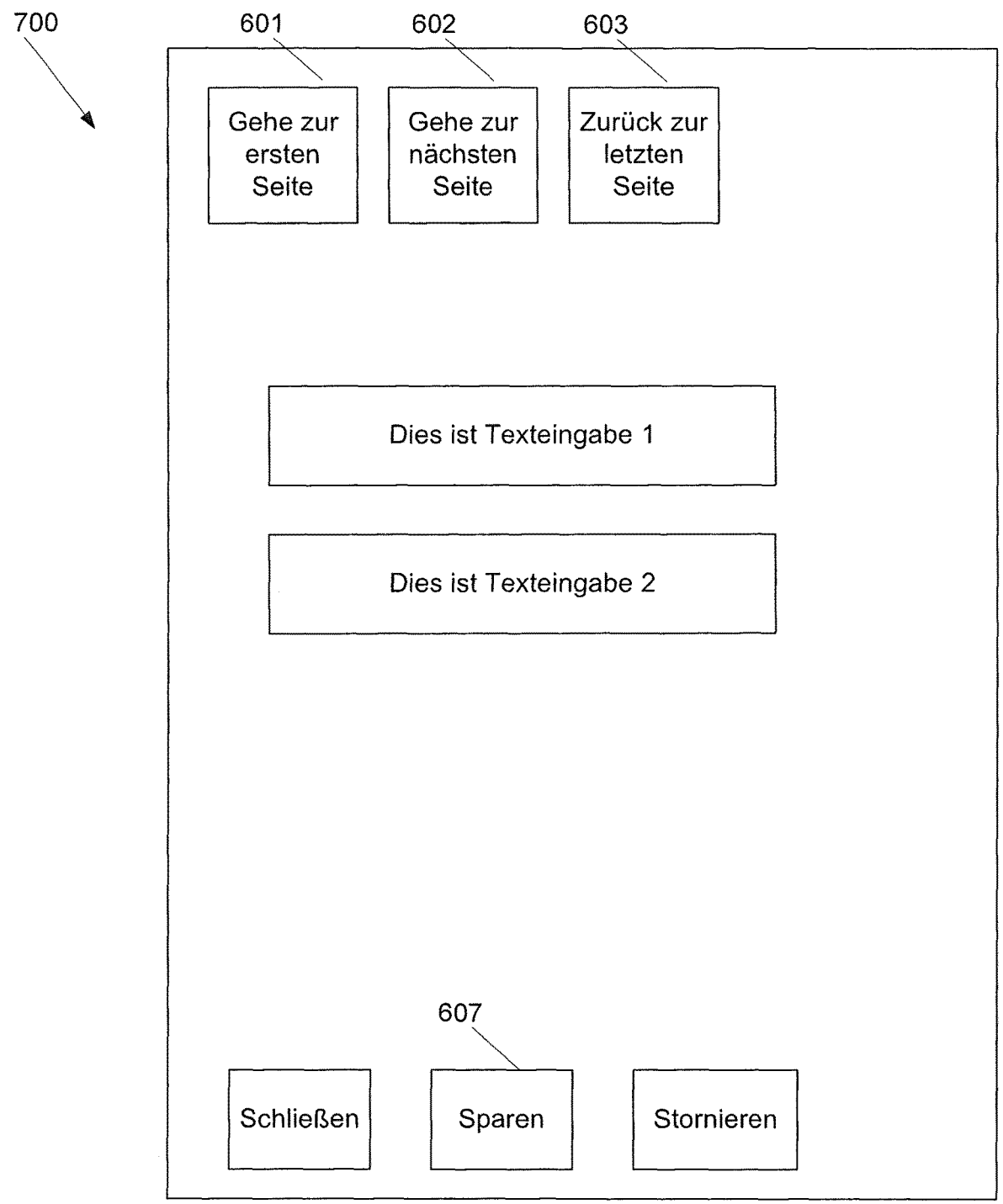
FIG. 7 depicts the example UI of FIG. 6 after translation from the first language to a second language (German).

For procedure a) described above, a UI provided in English, such as UI 600 as shown in FIG. 6, may be converted to a UI provided in German, such as UI 700 as shown in FIG. 7.

Figure 8:
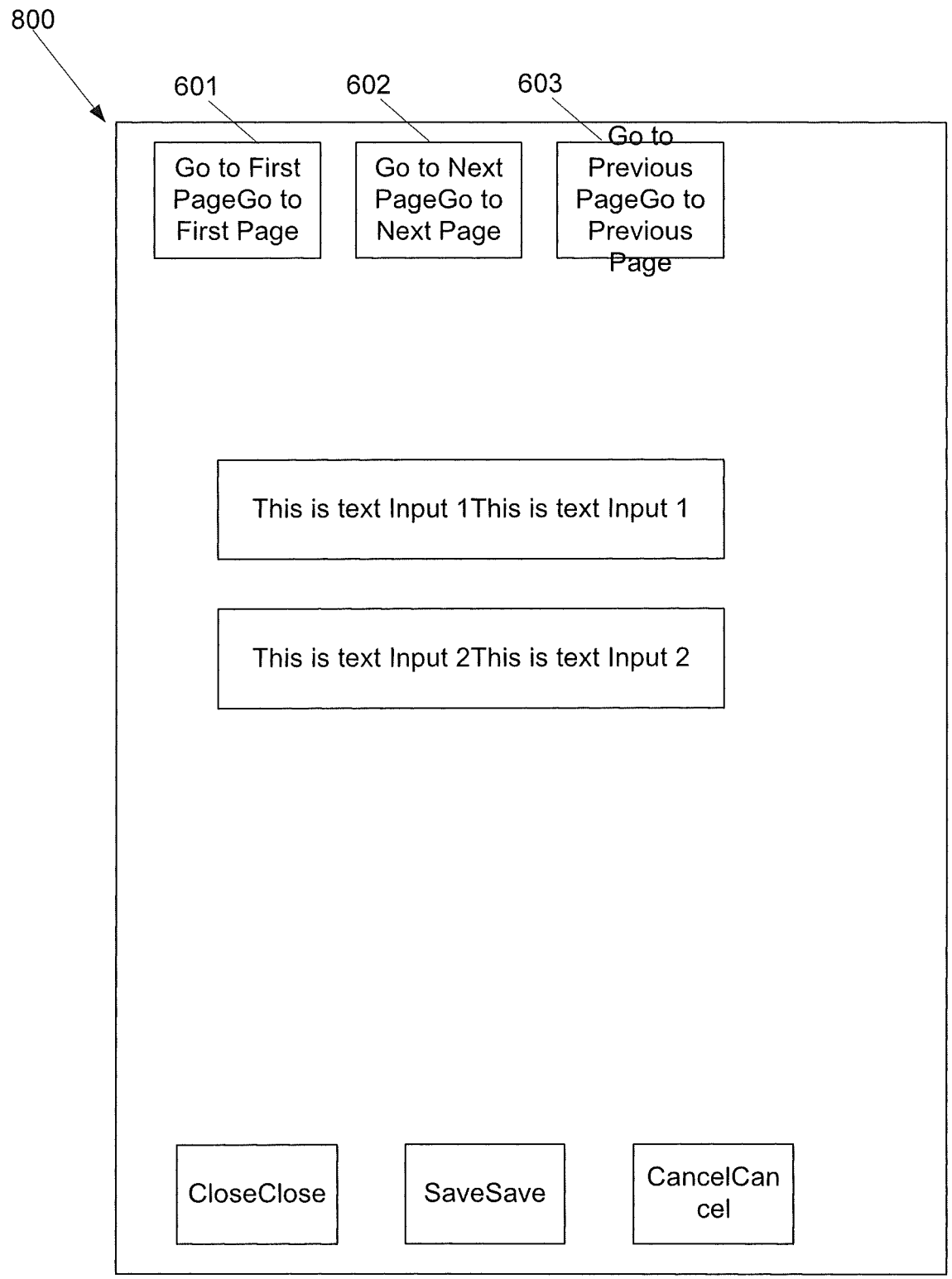
FIG. 8 depicts the example UI of FIG. 6 in which strings within the UI have been expanded in length to detect any potential translation issues, in accordance with one or more illustrative aspects described herein.
Figure 9:
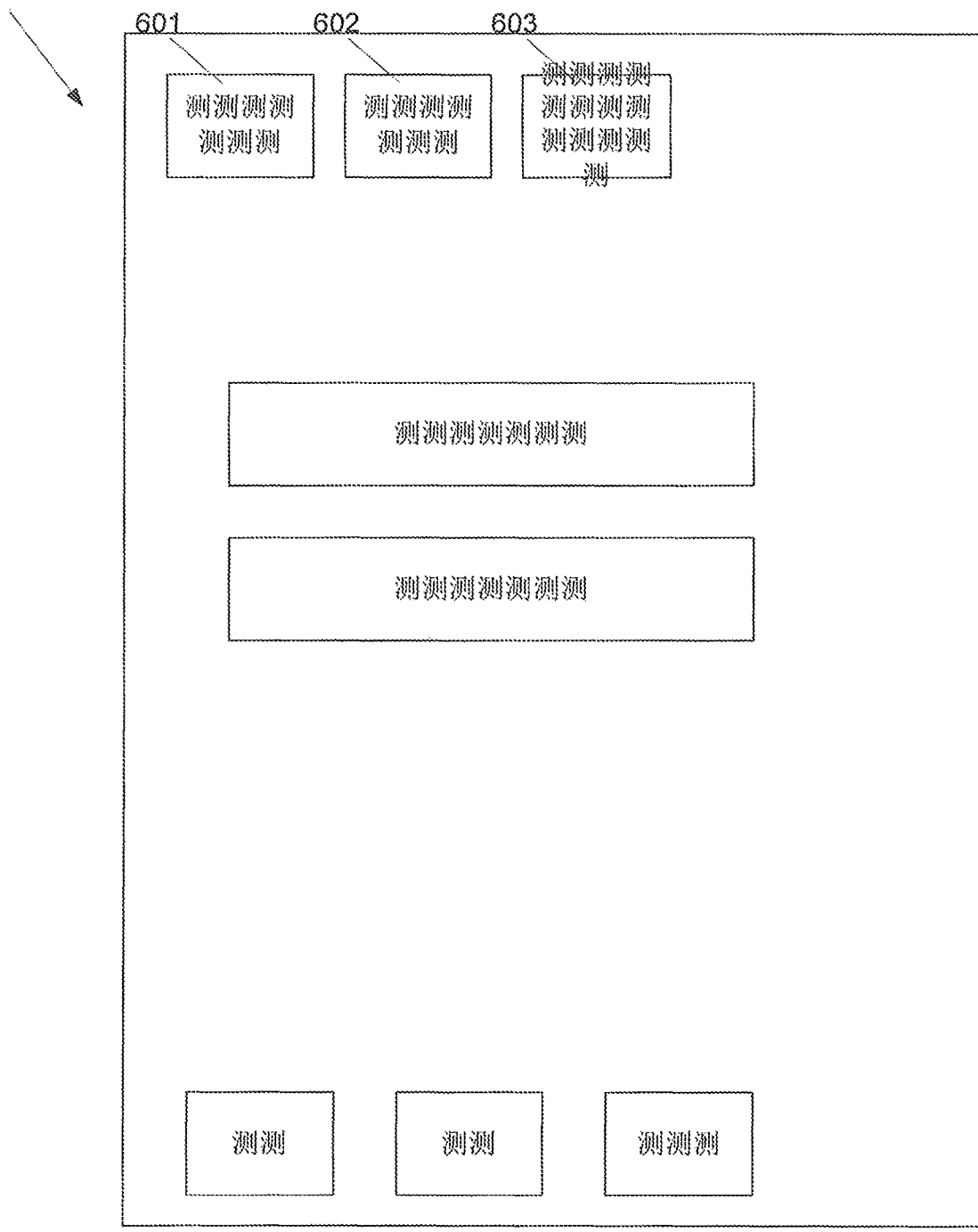
FIG. 9 depicts the example UI of FIG. 6 in which strings within the UI have been translated from non-Asian characters to Asian characters (e.g., Kanji characters) with the same characters used therein, to detect any potential translation issues, in accordance with one or more illustrative aspects described herein.
Figure 10:
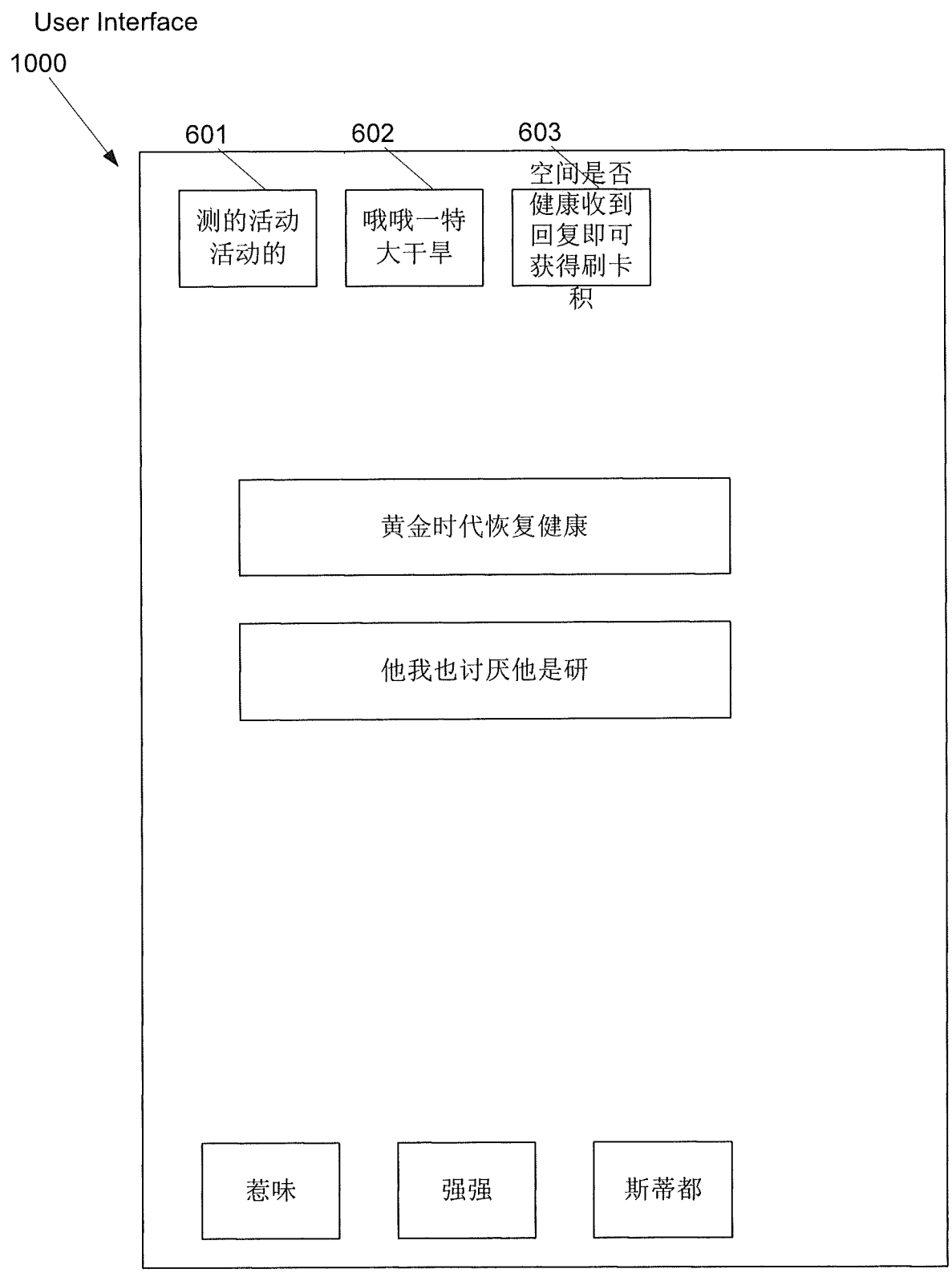
FIG. 10 depicts the example UI of FIG. 6 in which strings within the UI have been translated from non-Asian characters to Asian characters (e.g., Kanji characters) with the different characters used therein as chosen in a random manner, to detect any potential translation issues, in accordance with one or more illustrative aspects described herein.
Figure 11:
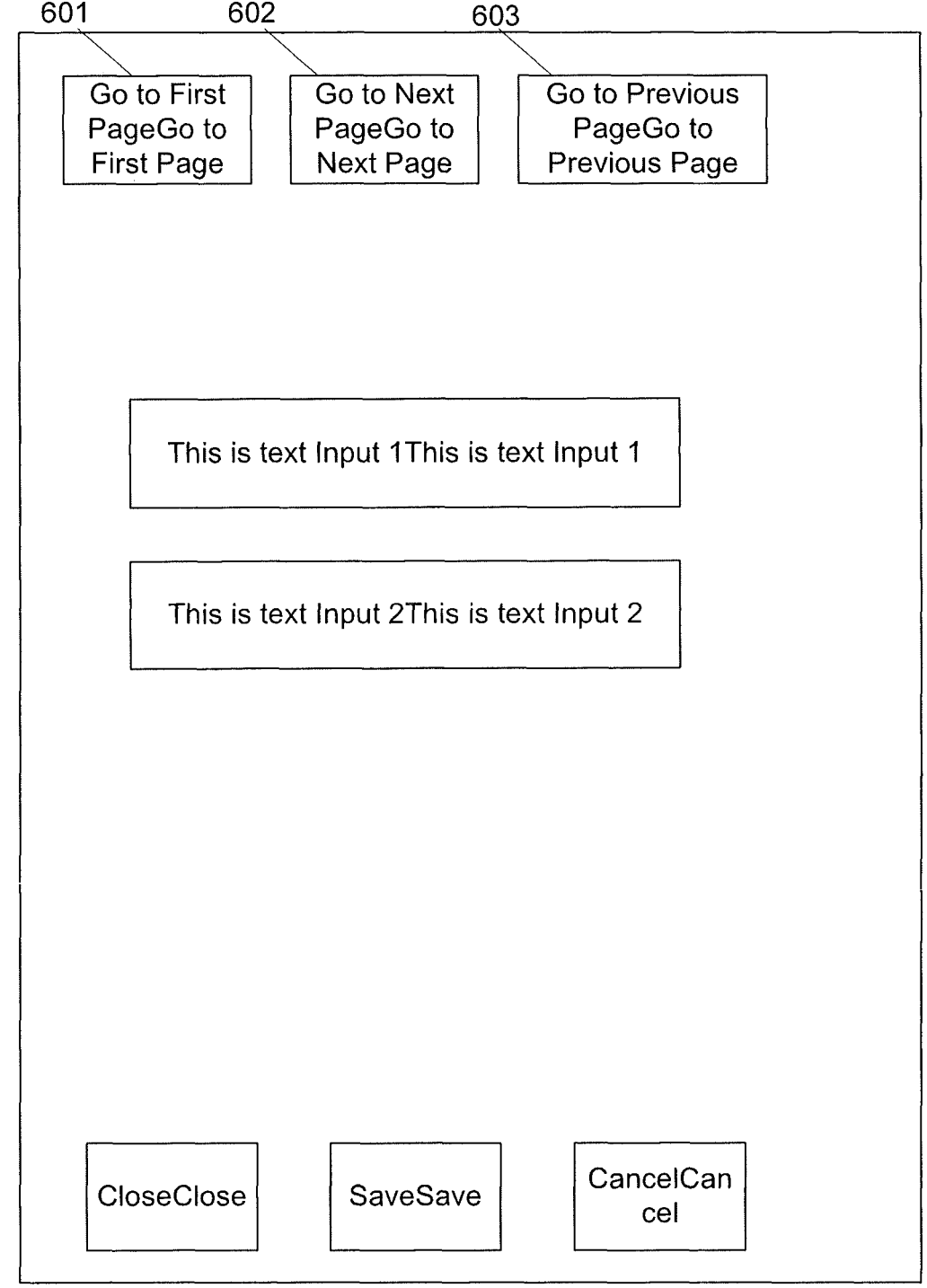
FIG. 11 depicts the example UI of FIG. 6 in which elements (e.g., text areas or buttons) within the UI have changed in size due to the expanded character string included within these elements, in accordance with one or more illustrative aspects described herein.
Figure 12:
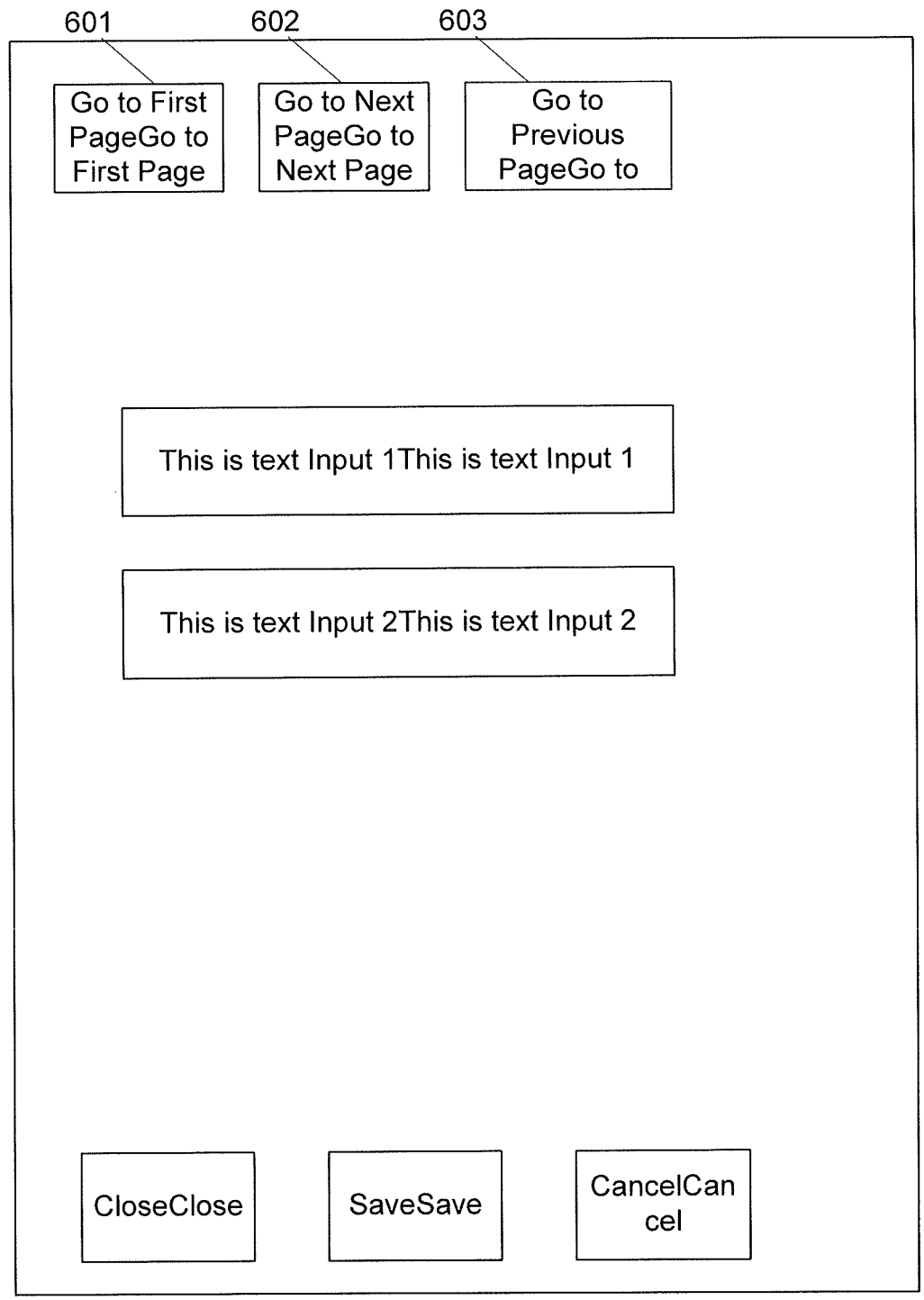
FIG. 12 depicts the example UI of FIG. 6 in which elements (e.g., text areas or buttons) within the UI have not changed in size after the expanded character string have been included within these elements, in accordance with one or more illustrative aspects described herein.
Figure 13:
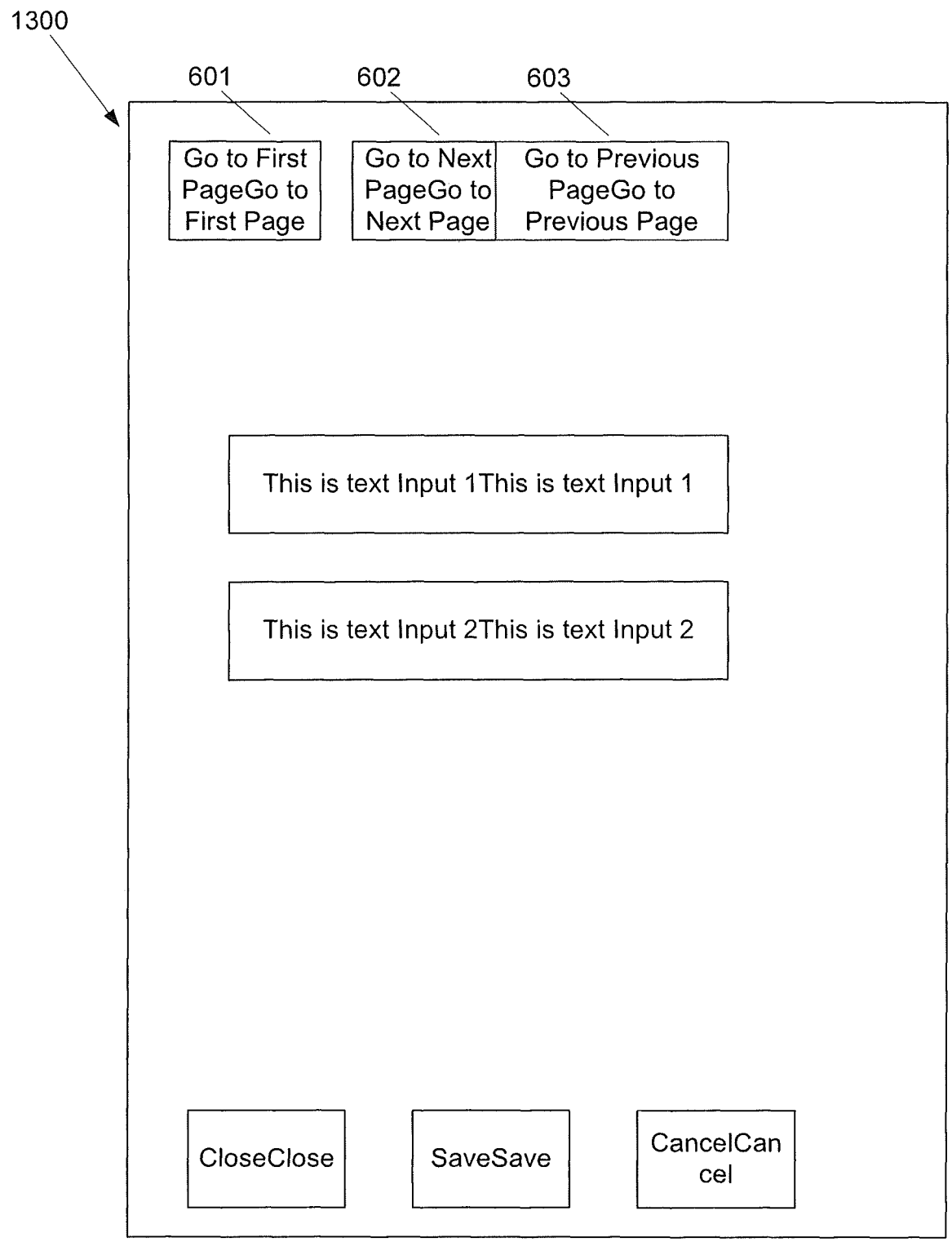
FIG. 13 depicts the example UI of FIG. 6 in which elements (e.g., text areas or buttons) within the UI have changed in size due to the expanded character string included within these elements in which at least two elements now overlap, in accordance with one or more illustrative aspects described herein.

For procedure b) described above, the UI 600 provided in English (see FIG. 6) may be converted to a double-English-string UI 800 as shown in FIG. 8, or to a double-English-string UI 1100 as shown in FIG. 11, or to a double-English-string 1200 as shown in FIG. 12, or to a double-English-string 1300 as shown in FIG. 13 (the difference between these four UIs will be explained in a later portion of this document).

For procedure c) described above, the original English language string is obtained, then it is expanded to a length of 1.x, and the original English language string is then converted to characters of a different language character set (e.g., Kanji characters) according to the expanded length. The assumption made here is that the length of one Kanji character equals the length of two English characters, and so 16 English characters would map to 8 Kanji characters. The Kanji characters used to replace the English language string may be the same Kanji character repeated the appropriate number of times, as shown in the UI 900 in FIG. 9, or the Kanji characters used to replace the English language string may be different Kanji characters randomly selected to create a string of an appropriate number of Kanji characters (e.g., 8 Kanji characters to replace the 16 English characters), as shown in the UI 1000 in FIG. 10.

Referring back to FIG. 5, in step 503, potential UI issues that may occur due to translation of a UI into another language are detected. A UI issue is something that may cause a display problem for a UI when the UI is converted from a first language to a second language. A UI issue may be caused by the truncation of text within a UI element such that the UI element is not readily understandable, such as shown in the top right button 603 of the UI 1200 in FIG. 12. Or, the UI issue may be due to the overlapping or intersection of one UI element with another UI element, such as shown in the overlapping of the top middle button 602 and the top right button 603 in the UI 1300 in FIG. 13. Or, the UI issue may be the spillage of text from a UI element outside of the bounds of that UI element, such as shown in the top right button 603 of the UI 800 of FIG. 8, in the UI 900 of FIG. 9, and in the UI 1000 of FIG. 10, leading to a non-professional looking UI that may cause the user to be wary of using the UI. When a UI issue is deemed to exist, that issue may be reported, which may lead to a UI software engineer being tasked to correct the UI issue.

In step 503, after UI content replacement has been made (in step 502 as described above), the UI test program detects whether any UI issues are found. In more detail, the UI test program checks if the UI element area (its width and height on a computer display) expands after content replacement. For example, a UI product may be coded such that as the amount of text within the element increases, the size of the UI element increases to accommodate that text, so that no truncation of the text within the UI element occurs. Alternatively, a UI product may be coded such that as the amount of text within the element increases, the size of the UI element remains the same or is only allowed to increase by a certain amount (e.g., 10% maximum increase over original size allowed) to accommodate that text, so that truncation of the text within the UI element may occur in these instances.

If the size of the UI element has not expanded, the UI test program may check to determine if all strings are found in the UI element. The determination as to whether all strings are found in the UI element may be accomplished by first capturing a screen shot of the UI element, and then reading the content inside the captured screen shot image by optical character recognition (OCR), and then by comparing the OCR result with the replaced content.

For example, referring now to FIG. 12, the text within the top right button 603 of UI 1200 is determined by OCR to be "Go to Previous PageGo to", which is different from "Go to Previous PageGo to Previous Page" of the double English language string that was placed inside the top right button 603 in step 502. This results in a potential UI issue, which may possibly be resolved by adjustments made in step 505 described later on, or which may continue as a UI issue that is to be reported in step 511.

Continuing with the procedure performed in step 503, if the size of the UI element has expanded, then the UI test program may check to determine if all strings are found in the expanded UI element. This may be performed in the same manner as described above when the size of the UI element has not expanded, by using OCR techniques after having taken a screen shot of the UI element. If the entire string cannot be found, then a potential UI issue is flagged.

If the entire string is found, then a check is made to determine if the expanded UI elements overlaps or intersects any other UI element, such as by performing the following procedure. First, all elements of the UI product are found as displayed in a display (e.g., as displayed on a computer monitor), and the area (x-coordinates, y-coordinates, width, height) of each UI element is determined. As explained earlier, the finding of all elements of the UI product may be performed by parsing the software used to create the UI, such by using a backend process (e.g., an API accessed via the UI test program) to analyze the lines of code (e.g., HTML code) making up the UI product to determine the x,y coordinates of each UI element, and/or by performing optical character recognition (OCR) of the UI created by execution of the UI product that is displayed on a display (e.g., a computer monitor, or on a smart phone screen) to determine the x,y coordinates of all text areas, buttons, text boxes, and user inputs that correspond to separate UI elements of the UI, as a frontend process For example, when using a frontend process, OCR may be used to obtain the screen size (entire width and height in an x,y coordinate space), and to obtain UI element positions with respect to the screen size, to thereby calculate the position of each UI element within the UI. Second, the area of each element found on the display is compared with the area of the expanded UI element, to determine if there is any overlap amongst two or more of the UI elements (that is, determine if the areas intersect with each other). By way of example, HTML code used to create a UI may have a first UI element, such as a first button provided on a top left region of the UI, assigned to a particular region of the UI, whereby that particular region of the first button is compared with corresponding regions assigned to all other UI elements of the UI, to determine if there may be an overlap of one or more regions, Turning now to FIG. 13, UI 1300 shown in that figure has a top middle button 602 and a top right button 603 in which one button overlaps the other button (or alternatively when one button abuts the other button), and this potential UI issue is identified for reporting in a record condition table (to be explained later in more detail). By way of example, the UI element that has a potential UI issue is identified in the record condition table with a "Yes" in the UI Issues field for the key associated with that UI element.

If no issues are found in the tests performed in step 503, then the "Issues Found?" step 515 is "No" and the process proceeds to step 506 to associate resources (to be described in detail below) and to step 507 to record condition (to be described in detail below). If any UI issues are found in the tests performed in step 703, then the "Issues Found?" step 515 is "Yes" and the process proceeds to step 504 to determine if the UI element(s) can be adjusted to resolve the UI issue.

In step 504, a check is made as to whether each UI element for which a UI issue has been detected in step 503 may be adjusted to resolve the UI issue for that UI element. Adjustment of the UI element may correspond to reducing the string length of that UI element (e.g., reducing the number of characters comprising the UI element), whereby the UI element with its adjusted character string is displayed on a computer monitor along with the rest of the UI that the UI element is to be displayed in. In this step, if the UI issue is triggered by translation-ready content for that UI element, then the UI element may not be adjusted, and the process proceeds to step 511 to report a UI issue for that UI element. As explained above, translation-ready content for a UI element may be content that has been created by a linguist specifically for that UI element (e.g., a German linguist who provided the word "Sparen" for "Save" when a UI product is to be converted for use by German-speaking users, in which the text for the bottom middle button 607 in UI 600 in FIG. 6 is converted to text for the bottom middle bottom 607 in FIG. 7), and which may be hardcoded into the HTML or XML code used to create the UI product. As such, that UI element may not be adjusted without having a higher authority (e.g., UI creation group supervisor) determine whether adjustment may be made after having been notified of the UI issue due to that UI element during the UI issue reporting conducted in step 511.

In step 504, if the UI issue is not triggered by translation-ready content for that UI element, and if the UI issue is triggered by content that has the same string length as the original content that has not been translated (e.g., the English language content), then the UI issue is due to something that occurred prior to translation of the UI element, and the process flows to step 511 to report the UI issue. The string length may be defined as the length of the character string for a UI element, such as a length of six (6) for the word "Sparen" that is to be displayed as six contiguous characters within a UI element (e.g., bottom right button) of a UI. Such a UI issue in this instance may be due to poor coding of a UI product by a software programmer, such as by creating text for a UI button that is too large to be accommodated within the UI button (and in which the software programmer has not allowed for a UI element to increase in size to accommodate text provided within that UI element). This may result in the UI product being sent back to the software programmer after the UI issue has been reported in step 511, to correct the UI issue that was due to his/her poor software programming.

If a UI issue is found for a UI element as determined in step 515, then the process flows to step 504 (see "Yes" arrow extending from step 515) to determine if the UI element can be adjusted such that the UI issue is resolved by reducing the size of the UI element. In one implementation, if a UI element is capable of being adjusted, the UI element may be reduced in size in step 505 by an amount equal to:

(Translated Length−Original Untranslated Length)/$N$,
where $N$ is a positive integer greater than or equal to one.

By way of example, for an adjustable UI element in which the original untranslated (English) character length is 10 characters, the translated length is equal to 10*2=20 characters (see description with respect to doubling the length of string with English characters in step 503 above). With N=5, then 20−10/5=10/5=2, which results in a reduction of the length of the UI element in step 505 from 20 characters to 20−2=18 characters. With the UI element reduced to 18 characters in step 505, step 503 is performed again to determine if any UI issues exist. If a UI issue exists ("Yes" in step 515), then information that includes the size of the UI element and that the UI issue exists for that size is stored in a record condition table in step 507 after having associated a resource for the UI element of the UI in step 506 (to be explained in more detail below), and step 505 continues to reduce the length of the UI element again. The record condition table records the conditions (e.g., string length) of each UI element that determine whether or not a UI issue exists for that UI element when it is converted to a different language. That way, when a UI product has been converted to a different language, the record condition table may be accessed to determine if the string length associated with a UI element of the UI product may result in a UI issue. Continuing with this example, the UI element is reduced in step 505 from 18 characters to 18−2=16 characters, and step 503 is performed again to determine if any UI issues exist. If a UI issue still exists ("Yes" in step 515), then information that includes the size of the UI element and that the UI issue exists for that size is stored in a record condition table in step 507, and the process returns back to step 505 to reduce the length of the UI element yet again. If a UI issue no longer exists ("No" in step 515), then information that includes the size of the UI element and that the UI issue does not exist for that size is stored in the record condition table in step 507. By way of example, the record condition table may be stored in RAM 205 or in memory 215 of computing device 201 as shown in FIG. 2, or may be stored in the Cloud in one of the virtual machines 332A, 332B, 332C in virtualization system 301 as shown in FIG. 3, or in one of storages 404A and accessed via management server 400 as shown in FIG. 4.

In some implementations, the record conditions table stores, for each UI element of a UI product, a) the minimum length that a UI issue occurs, and b) the maximum length that a UI issue does not occur. So, continuing with the above example, assume that the reduced 18-character UI element A results in a UI issue, and that the further-reduced 16-character UI element does not result in a UI issue. Based on this, the record conditions table stores, for UI element A, a first data entry for UI element A in which the UI element size field is "18" and UI issue field is "Yes", and a second data entry for UI element A in which the UI element size field is "16" and the UI issue field is "No". No further information needs to be stored in the record condition table for that UI element.

If no UI issues are found ("Issues Found?" step 515="No"), then the process flows to step 506, to associate resources. In more detail, if there is no UI issues found in step 503, the UI test program associates the UI element with a backend resource file. A backend resource file may store one or more character strings used to populate a UI. As an example, a UI product, such as an HTML or XML software program, may read a backend resource file to obtain text for each of the UI elements in the UI. Thus, for example, if the UI product has a line of code "UI Element A=<X>", a backend resource file called by the UI product may have information corresponding to "X=GO TO FIRST PAGE", so that the top left button 601 for the UI 600 as shown in FIG. 6 may be created as a result. A backend resource file may contain the data of each UI element that the UI product accesses to create a UI for display, and may correspond to a plurality of characters associated with each of the UI elements making up the UI. By way of example, the backend resource file may be a text file, e.g., a .txt file, or an Excel file, read by the UI product to fill in information for one or more UI elements of a UI, whereby each UI element has an associated "key" in the backend resource file. In more detail, when the UI product is executed to create a UI for display on a computer monitor or smart phone screen, the UI product reads a backend resource file to obtain the content to provide for each of the UI elements (e.g., each of the buttons making up a UI) to be displayed for viewing by a user.

Continuing with step 506, as a representative example, a string in button A of a UI is associated with a "string ID A" in the corresponding resource file for the UI, and a string in text area B of the UI is associated with a "string ID E+string ID F" in the corresponding resource file.

After performing the associate resource step 506, the process flows to step 507, to record condition in a record condition table. By way of example, the record condition table may record (i.e., store) the following information:

| Resource ID | String Length | UI issues |
| --- | --- | --- |
| A | 10 | No |
| B | 20 | Yes |
| B | 15 | No |
| B + C | 20 | Yes |
| B + C | 18 | No |

The above information indicates that for UI element A, the string length (increased to determine if any UI issues occur for that element due to translation of that element into another language) of 10 does not result in a UI issue. The above information also indicates that for UI element B, the increased string length of 20 results in a UI issue, and that the reduced string length of 15 does not result in a UI issue for that element. The above information also indicates that for UI elements B+C, the string length of 20 results in a UI issue, and the reduced string length of 18 does not result in a UI issue. UI elements B and C may be two buttons that are adjacent to each other on a UI display (e.g., see buttons 602 and 603 in FIG. 7), whereby reduction of the combined length of text in UI elements B and C from 20 to 18 does not result in overlap of these two buttons on the UI display (but where the combined length of text in UI elements B and C being equal to 20 or more results in overlap of these two buttons on the UI display, such as shown by the overlap of buttons 602 and 603 in FIG. 13).

The above description of steps performed according to aspects of the invention provides for a mechanism to determine whether or not UI issues exists for a UI product that is to be translated into one or more languages. This determination may be made without having to translate the entirety of the UI product, that is, without having to translate each of the UI elements making up the UI product by an expensive linguist. Rather, other less costly procedures may be performed to determine whether a UI issue exists, such as by using machine translation of some UI elements, or by doubling the size of a UI element, or by replacing UI elements by a certain number of characters associated with a different language (e.g., replacing Greek characters with Asian characters), which do not require the detailed services of a linguist fluent in multiple languages.

After the UI product has been tested for UI translation issues as described above, and if no UI issues are found, the UI product may be translated into one or more languages, for use by users in those one or more languages as their preferred way to access an application with a UI. Referring again to FIG. 5, in step 508, a UI product resource is translated from a first language (e.g., English) to a second language (e.g., Chinese). The UI product resource may correspond to the information (e.g., character strings of UI elements) used to create a UI, and may correspond to a text (.txt) file created in a particular language, for which the UI product calls to create a UI, for example. If the UI product resource has previously been translated in any of the above steps discussed above, then step 508 is not performed, whereby step 508 is shown in FIG. 5 as an optional step in that case.

In step 509, the translated UI resource is obtained. The UI test program may obtain all translated UI resources for each different language that the UI is to be translated. So, for example, a file name "resource_eng.txt" in English may be translated into a first file name "resource_fr.txt" as a French translation, a second file name "resource_de.txt" as a German translation, etc. The translation of the UI resources may be performed by a linguist fluent in more than two or more languages, or by a machine language application, whereby each of the character strings of the UI resource (i.e., the UI backend resource file) is translated from a first language (e.g., English) to a second language (e.g., French) to obtain the translated UI resource in that second language. In some instances, a translation memory may be used to store translations of UI resources obtained by a linguist or by using a machine translation application, whereby previously translated strings may be obtained from the translation memory and used to translate similar strings of UI elements, without requiring the assistance of a linguist or the use of a machine translation application.

After step 509 is performed, the process flows to "Compare Condition" step 510, in which conditions in the record condition table obtained in step 507 are compared to information in the translated resource file obtained in step 509. Both a single key length check (a single UI element, such as the top left button 601 of UI 600 shown in FIG. 6) and a key combination check (multiple UI elements, such as the top middle button 602 and the top right button 603 of UI 600 shown in FIG. 6) may be performed in this step.

In more detail, each UI element of a UI product has an associated key in a UI resource file that may be used to provide the characters for display with that UI element (e.g., the word "Save" within a button of a UI). For example, key "A" of a UI resource file may be associated with a particular UI element of a UI product that accesses the UI resource file, whereby each UI element may be assigned a unique ID as its "key" in the UI resource file. For example, the top right button of a UI may have an ID "top_right button" assigned as its key in a UI resource file. Each key in the UI resource file may have a length defined for it, such as a length of 20 pixels and a height of 10 pixels for a button associated with that key. For the single key length check performed in step 510, the string length of a UI element associated with each key in the UI resource file is obtained by determining the number of characters of the UI element associated with the key (e.g., by OCR of a UI displayed on a display, or by using a backend process to analyze lines of code of the UI product to determine characteristics of each UI element defined in the UI product), and a check is made as to whether that string length associated with the UI element associated with that key may cause a UI issue for that UI element, based on the information in the record condition table for that key. Referring to the record condition table example described above, if the French-translated resource file "resource_fr.txt" for key "B" has a string length of 14 characters, then this will not result in a UI issue for the UI element associated with key "B", since a 15 character string length for key "B" has "No" in its "UI issues" field. Conversely, a string length of 22 characters for key "B in the French-translated resource file "resource_fr.txt" will result in a UI issue for that UI element. If a UI element associated with key "B" has a French-translated string length between 16 and 19, it cannot be determined based on the information in the record condition table if that will result in a UI issue based on the information stored for key "B" in the record condition table. In this case, a UI issue for the UI element associated with key "B" may be identified and reported in 'Report Issues' step 511 as a safety measure, and whereby further analysis may be required to determine whether or not a UI issue may exist for this UI element for string lengths between 16 and 19. In this instance, there is a tradeoff on the amount of information provided in the record condition table and the ability to determine whether or not a particular sized translated string length of a UI element associated with a particular key may cause a UI issue for that UI element.

Referring back to step 505, the integer value N may be increased in size to obtain more information in the record condition table and hence a higher UI issues detection accuracy when a particular sized translation string length is obtained, whereby this may result in higher computer resource usage to obtain the additional information in the record condition table. For example, if the value N is changed from 5 to 10 in the example provided above for describing the operation of the reduce element length step 505, the size of the character string is reduced by only one character (20−10/10=1) instead of by two characters for each iteration in which the UI element length is reduced, thereby providing more information for storage in the record condition table, but with additional computational effort required as the tradeoff.

For a key combination check performed in step 510, the key combination is initially determined, such as by the concatenation of more than one key or UI element of a UI. Then, the string length of the key combination is obtained from the translated UI resource file. For example, if a string associated with a UI element is concatenated by "Key A+<Space>+Key B," then the length of the string for that UI element corresponds to "length (key A)+length (<Space>)+length (key B)." Then, a check is made as to whether the length of the key combination may cause a UI issue to occur. If a UI issue exists for the key combination, then that is reported as a UI issue in step 511. As shown in the record condition table example above, single keys as well as key combinations may be stored in the record condition table, whereby the key combination B and C ("B+C") stored in the record condition table may be associated with two adjacent UI elements or buttons of a UI that are displayed on a computer monitor or on a smart phone screen.

FIG. 14A depicts representative HTML code that may be used to create a UI product and that may be tested by a UI test program, in accordance with one or more illustrative aspects. In the HTML code, one line of code include the words "Conference Reception", which is the key associated with a UI element within a UI created by the HTML code.

FIG. 14B depicts a portion of a UI created by the sample HTML code of FIG. 14A, in which the words "Conference Reception" appear in a portion of the UI display next to a time of day (between 6 pm and 7 pm) in which that event is to occur, and corresponds to a UI element of the UI. By parsing the HTML code of FIG. 14A to extract the line of code 1400 containing the words "Conference Reception" as the key for that UI element, certain procedures may be performed, such as the three separate procedures explained beforehand with respect to step 503 of FIG. 5, to determine if translation of this UI element into one or more other languages may result in a UI issue for the UI.

If any UI issues are determined in step 510, those UI issues are reported in "Report Issues" step 511. Reported UI issues may result in the eventual reprogramming of the UI product code by a software programmer tasked to resolve those issues.

One or more aspects provide for a mechanism to detect conditions when UI issues may exist before translation of a UI product, whereby UI issues may be detected by analyzing a backend UI resource file without having to open the UI. For example, a condition when a UI issue may occur can be identified when the UI product is in the original language that it was created (e.g., in English) without having to translate the entire UI product, to find UI defects that may occur when UI resource strings have been translated into one or more different languages. This provides a savings with respect to translation costs of a UI product, since a linguist's translation of a UI product is not required to test a UI product for UI translation issues. This also provides good customer relations by resolving any UI translation issues prior to sending a UI product after having been translated into a different language and being informed of a UI issue by an angry consumer after having used the UI product in that different language. Also, by not having to open a translated UI, but rather by analyzing a translated backend UI resource file (e.g., UI_resource_file_FR.txt), and compare information in the backend UI resource file(s) with information in a record condition table to determine if a UI issue may exist for one or more keys (and their associated UI elements of a UI), time and cost savings for supporting a UI that has been translated into multiple languages may be obtained.

As illustrated above, various aspects of the disclosure relate to detection and correction (if possible) of issues due to translation of a user interface (UI) product from a first language into a second language. While the subject matter has been described in language specific to structural features and/or methodological acts, it is to be understood that the subject matter defined in the appended claims is not necessarily limited to the specific features or acts described above. For example, in step 505 of FIG. 5, the UI element that resulted in a UI issue being detected may be further modified in some embodiments by making a font size of the UI element smaller to see if the UI issue is resolved. This may be done if the reduced font size is greater than a minimum acceptable font size for a UI product, such as greater than 10 characters per inch font size. In this example, referring now to FIG. 8, the reduced font size of "Go to Previous Page Go to Previous Page" in the top right UI button 603 from a size 12 font to a size 10 font may result in the entire "Go to Previous Page Go to Previous Page" being viewable totally within the top right UI button 603 as seen in UI 1100 in FIG. 11, thereby resolving the UI issue for that UI element (under the proviso that size 10 font is acceptable for this particular UI product). Font size can be defined by a UI designer (and/or UI software programmer) at the beginning stages of UI product development, and the UI designer may set a range of how much the font size may be reduced (e.g., no more than 20% reduction in font size), so that the text is still readable by a user of the UI having standard eyesight.

As an alternative element reduction process that may be performed in step 505 of FIG. 5, a database of approved word abbreviations may be queried to determine if a UI element that is of too large a size (and thus results in a UI issue) may be reduced in size to overcome the UI issue due to that UI element. For example, the abbreviated phrase "Go to Prev Page" may be stored as an acceptable abbreviation phrase for "Go to Previous Page", whereby the double-English-language text UI of "Go to Prev PageGo to Prev Page" that is provided for a UI element in step 502 does not result in button overlap, unlike the double-English-language text UI of "Go to Previous PageGo to Previous Page" in UI 1300 as shown in FIG. 13. With this implementation, translation-ready content that may result in a UI issue may be swapped with abbreviated translation-ready content as obtained from an approved word abbreviations table, in cases where translation-ready content results in a UI issue but where its abbreviated translation-ready content does not result in a UI issue.

The specific features and acts described above are described as some example implementations of the following claims.

What is claimed is:

1. A method comprising:
parsing a user interface (UI) product to obtain a UI element provided therein, the UI product prepared in a first language;
replacing a UI element with a converted UI element, the converted UI element consisting of a translation of the UI element into a second language different from the first language, wherein the replacing comprises:
obtaining a machine language translation of the UI element,
increasing a length of the UI element by a predetermined amount, and
switching characters of the UI element from a first character set associated with the first language to characters of a second character set associated with the second language, wherein the first character set comprises English language characters, and wherein the second character set comprises either Chinese characters or Arabic characters, and wherein each character of the second character set is twice a display size of each character of the first character set;
detecting whether a UI issue exists in the UI product after replacement of the UI element;
when a UI issue is detected, modifying the converted UI element so that translation of the UI product into the second language does not include the detected UI issue;
providing the UI element in a language different from the first language via the UI product based on the converted UI element;
storing, in a storage, information comprising a size of the modified converted UI element and whether the modified converted UI element has corrected the UI issue; and
reporting any UI issues that remain for the UI product after modification of the converted UI element has occurred.

2. The method of claim 1, wherein each UI element of the UI product has an associated key in a corresponding UI resource file, the method further comprising:
determining, for each key of the UI product, if any translated UI element of the UI product translated to the second language exceeds a length of a modified converted UI element of a corresponding UI element for the same key that is stored in the storage; and
when any translated UI element of the UI product translated to the second language exceeds a length of the corresponding modified converted UI element stored in the storage, reporting a translation UI product issue.

3. The method of claim 2, wherein replacing a UI element with a converted UI element comprises one of obtaining the machine translation, increasing the length of each UI element, or switching characters of each UI element from the first character set to the second character set.

4. The method of claim 1, wherein the detecting comprises:
detecting whether the replacement of the UI element with the converted UI element results in an overlap with another UI element to be displayed within a UI created by the UI product, and if so, detecting that a UI issue exists.

5. The method of claim 1, wherein the detecting comprises:
detecting whether the replacement of the UI element with the converted UI element results in a truncation of a character string to be displayed within the UI element of a UI created by the UI product, and if so, detecting that a UI issue exists.

6. The method of claim 1, wherein modifying the converted UI product comprises:
modifying the converted UI product in a predetermined manner that incrementally lessens a size of the converted UI element.

7. One or more non-transitory computer-readable media storing instructions which, when executed by a system that includes at least one processor and a memory, cause the system to:
parse a user interface (UI) product to obtain a UI element provided therein, the UI product prepared in a first language;
replace a UI element with a converted UI element, the converted UI element consisting of a translation of the UI element into a second language different from the first language, wherein the replace comprises:
obtain a machine language translation of the UI element,
increase a length of the UI element by a predetermined amount, and
switch characters of the UI element from a first character set associated with the first language to characters of a second character set associated with the second language, wherein the first character set comprises English language characters, and wherein the second character set comprises either Chinese characters or Arabic characters, and wherein each character of the second character set is twice a display size of each character of the first character set;
detect whether a UI issue exists in the UI product after replacement of the UI element;
when a UI issue is detected, modify the converted UI element so that translation of the UI product into the second language does not include the detected UI issue;
provide the UI element in a language different from the first language via the UI product based on the converted UI element;
store, in a storage, information comprising a size of the modified converted UI element and whether the modified converted UI element has corrected the UI issue; and
report any UI issues that remain for the UI product after modification of the converted UI element has occurred.

8. The one or more computer readable media of claim 7, wherein each UI element of the UI product has an associated key in a corresponding UI resource file, and wherein the instructions, when executed by the system, further causing system to:
determine, for each key of the UI product, if any translated UI element of the UI product translated to the second language exceeds a lengths of a modified UI element of a corresponding UI element for the same key that is stored in the storage; and
when any translated UI element of the UI product translated to the second language exceeds a length of the corresponding modified converted UI element stored in the storage, report a translation UI product issue.

9. The one or more computer readable media of claim 8, wherein replace a UI element with a converted UI element comprises one of: obtain the machine translation, increase the length of each UI element, or switch characters of each UI element from the first character set to the second character set.

10. The one or more computer readable media of claim 7, wherein the detect comprises:
   detect whether the replacement of the UI element with the converted UI element results in a truncation of a character string to be displayed within the UI element of a UI created by the UI product, and if so, detect that a UI issue exists.

11. The one or more computer readable media of claim 7, wherein modify the converted UI product comprises:
   modify the converted UI product in a predetermined manner that incrementally lessens a size of the converted UI element.

12. A computing device comprising:
   a processor configured to:
      parse a user interface (UI) product to obtain a UI element provided therein, the UI product prepared in a first language;
      replace a UI element with a converted UI element, wherein the converted UI element consisting of a translation of the UI element into a second language different from the first language, wherein the replace comprises:
         obtain a machine language translation of the UI element,
         increase a length of the UI element by a predetermined amount, and
         switch characters of the UI element from a first character set associated with the first language to characters of a second character set associated with the second language, wherein the first character set comprises English language characters, and wherein the second character set comprises either Chinese characters or Arabic characters, and wherein each character of the second character set is twice a display size of each character of the first character set;
      detect whether a UI issue exists in the UI product after replacement of the UI element;
      when a UI issue is detected, modify the converted UI element so that translation of the UI product into the second language does not include the detected UI issue; and
      provide, based on the converted UI element, the UI element in a language different from the first language via the UI product for display on a display; and
   a memory configured to store information associated with the converted UI element and modified converted UI element, the information including, for each of the converted UI element and the modified converted UI element, a string length and whether or not the string length results in a UI issue.

13. The computing device of claim 12, wherein the replace comprises:
   obtain a machine language translation of the UI element;
   increase a length of the UI element by a predetermined amount; and
   switch characters of the UI element from a first character set associated with the first language to characters of a second character set associated with the second language.

* * * * *